(12) United States Patent
Hsu

(10) Patent No.: US 8,689,404 B2
(45) Date of Patent: Apr. 8, 2014

(54) ROTARY SHAFT STRUCTURE

(75) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/568,453

(22) Filed: Aug. 7, 2012

(65) Prior Publication Data

US 2014/0041155 A1 Feb. 13, 2014

(51) Int. Cl.
*E05D 11/08* (2006.01)

(52) U.S. Cl.
USPC ............ 16/342; 16/337; 16/340; 16/386

(58) Field of Classification Search
USPC ............ 16/337, 342, 335, 334, 341, 344; 361/679.08, 679.11, 679.02, 679.15, 361/679.27; 455/90.3, 575.1, 575.3, 575.8; 379/433.12, 433.13; 348/373, 333.01, 348/333.06, 794
See application file for complete search history.

(56) References Cited

U.S. PATENT DOCUMENTS

| | | | | |
|---|---|---|---|---|
| 4,785,500 A * | 11/1988 | Langridge | ................ | 16/297 |
| 6,108,868 A * | 8/2000 | Lin | ................ | 16/340 |
| 6,470,532 B2 * | 10/2002 | Rude | ................ | 16/335 |
| 6,708,370 B2 * | 3/2004 | Shih et al. | ................ | 16/332 |
| 7,096,534 B2 * | 8/2006 | Wang et al. | ................ | 16/284 |
| 7,377,012 B2 * | 5/2008 | Lu | ................ | 16/342 |
| 7,464,439 B2 * | 12/2008 | Chen | ................ | 16/340 |
| 7,578,032 B2 * | 8/2009 | Chen | ................ | 16/374 |
| 8,082,627 B2 * | 12/2011 | Chien | ................ | 16/342 |
| 2010/0000047 A1 * | 1/2010 | Chang | ................ | 16/334 |

* cited by examiner

*Primary Examiner* — Chuck Mah
(74) *Attorney, Agent, or Firm* — Rosenberg, Klein & Lee

(57) ABSTRACT

A rotary shaft structure is provided with rotational and locating functions based on a compact request condition. The rotary shaft structure includes a combination of a shaft body and a braking device, in which the braking device includes a first end provided with a limiting portion and a second end provided with an assembling portion, thereby preventing an axial displacement of a rotary shaft. The shaft body corresponding to the first end of the braking device and the limiting portion thereof includes a base portion and at least one braking portion formed on the base portion, in which a locating function is formed when an interference state of the limiting portion of the braking device and the braking portion of the shaft body is formed, thereby improving the conditions of assembly and fitting difficulties, complication and time-consuming process in conventional skills.

11 Claims, 3 Drawing Sheets

ROTARY SHAFT STRUCTURE

BACKGROUND OF THE INVENTION

1. Field of the Invention

The invention relates to a rotary shaft device applied in an electronic apparatus, in particular relates to a combination of a rotary shaft and a braking device which is capable of generating rotational and locating functions in an operating and fitting processes.

2. Description of the Related Art

Pivot shafts or rotary shafts, which are capable of being reciprocally freely rotated by an external force to be assembled on an electric apparatus (e.g., mobile phones, laptops, personal digital assistant, digital image capturing devices and electronic-books, etc.) to rotatably open and close covers, display screens or viewing windows thereof, are generally known as conventional skills.

Such pivot shaft or rotary shaft is generally assembled with components such as through-hole washers, friction plates and elastic members thereon, in which two ends of the rotary shaft are respectively fixed with fasteners, thereby preventing axial displacement of the above-described components and forming a rotary shaft structure with axial compactness. In conventional skills, a structure which is capable of being immediately formed with a locating function as a pivot shaft or a rotary shaft is rotated is disclosed.

One topic related to operations, motions and structure designs of the above-described cases shall be concerned is that, based on embedded structures such as locating flanges, convex pockets or concavo-convex locating portions which are disposed on relative planes of washers, elastic plates or elastic members, friction plates or related components, the flange is formed with locating function in the rotation operation of the rotary shaft when the flange is rotated to the position of the convex pocket. However, after an operation period, the locating effects of these flanges, convex pockets or concavo-convex locating portions applied on relative fitting planes of electronic products are soon inconsiderable due to abrasion constantly generated by rigid contacts.

As to the combination of the multiple washers and friction plates, together with in cooperation with energy storage and release of elastic rings or springs to attain rotational and locating functions of the rotary shaft or pivot shaft component applied in conventional skills, it will be understood by those who skilled in these arts in that the whole structure design and assembly fitting become more complicated, and an assembled arrangement length of the whole structure in an axial direction is greatly increased, thus to limitedly impair the arrangement space of the rotary shaft and the electronic apparatus.

Another topic related to assembly and fitting of the rotary shaft and the locating components is that the elastic clamping function or the force regulation of frictional resistance is acquired by operation of the lock-packing degree of the screw nut. If the packed washer is too slack, the rotary shaft (or a cover, a display screen) cannot have an ideal locating effect. However, if the packed washer is too tight, the washer is regularly formed with stress and deformation, and in particular abrasions are easily generated between the fitted components to cause unstableness and slackness of the rotary shaft after the rotary shaft is operated.

Therefore, it relatively becomes more inconvenient and difficult to adjust the screw nut to pack the washer by an assembling fitter for obtaining an ideal elastic clamping function or frictional resistance. In practice, the washer is often deformedly destroyed to form the rotary shaft as a defect product and to increase the manufacturing cost, and certainly these conditions are not our expectations.

Representatively speaking, these reference data reveal the conditions of usage and structural design of the rotary shaft, the locating components or components connected therewith. If the structure and the above-described applications of the rotary shaft and components connected therewith can be properly redesigned and reconsidered, the use patterns and the application conditions of the rotary shaft can be advancedly altered and therefore distinguished from conventional methods, and it is actually not only to improve conditions such as easy-to-produce stress and deformation destructions or abrasion on the fitted components, but also to increase the assembling convenience. For example, based on the structure design of the rotary shaft capable of satisfying without increasing fitting difficulty, providing a mechanism to prevent axial displacement or slackness, or featuring with aspects different from conventional skills, conditions such as easy-to-produce abrasion and imperfect locating effect in the operation process of the rotary shaft in conventional skills can be improved. However, these topics are not taught or disclosed in the above-mentioned reference data.

BRIEF SUMMARY OF THE INVENTION

In view of this, the main purpose of the invention is to provide a rotary shaft structure with rotational and locating functions based on a compact request condition. The rotary shaft structure includes a combination of a shaft body and a braking device, in which the braking device includes a first end provided with a limiting portion and a second end provided with an assembling portion, thereby preventing an axial displacement of a rotary shaft. The shaft body corresponding to the first end of the braking device and the limiting portion thereof includes a base portion and at least one braking portion formed on the base portion, in which a locating function is formed when an interference state of the limiting portion of the braking device and the braking portion of the shaft body is formed, thereby improving the conditions of assembly and fitting difficulties, complication and time-consuming process in conventional skills.

According to the rotary shaft structure of the invention, the braking portion of the shaft body is formed by type of a plane, and the limiting portion of the braking device corresponding to the plane-type braking portion of the shaft body is also formed by type of a plane. Therefore, a stable locating function can be certainly obtained when the limiting portion of the first end of the braking device and the braking portion of the shaft body are formed with an interference state.

According to the rotary shaft structure of the invention, the assembling portion of the second end of the braking device formed by type of a claw-shaped object is fastened on the shaft body, so that the rotary shaft does not generate axial displacement or slackness.

According to the rotary shaft structure of the invention, the shaft body is assembled with a carrier. Actually, the shaft body and the carrier can be assembled on an electronic apparatus, or the shaft body and the carrier can be respectively assembled on a machine body module and a motion module (e.g., a cover or a display screen) of the electronic apparatus. The carrier is provided with a sheathing portion and a convex portion formed on the sheathing portion. The braking device corresponding to the convex portion of the carrier is formed with a hole pivoted to the convex portion of the carrier, so that the braking device is motioned to response to the rotation of the carrier.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figures 1, 2:
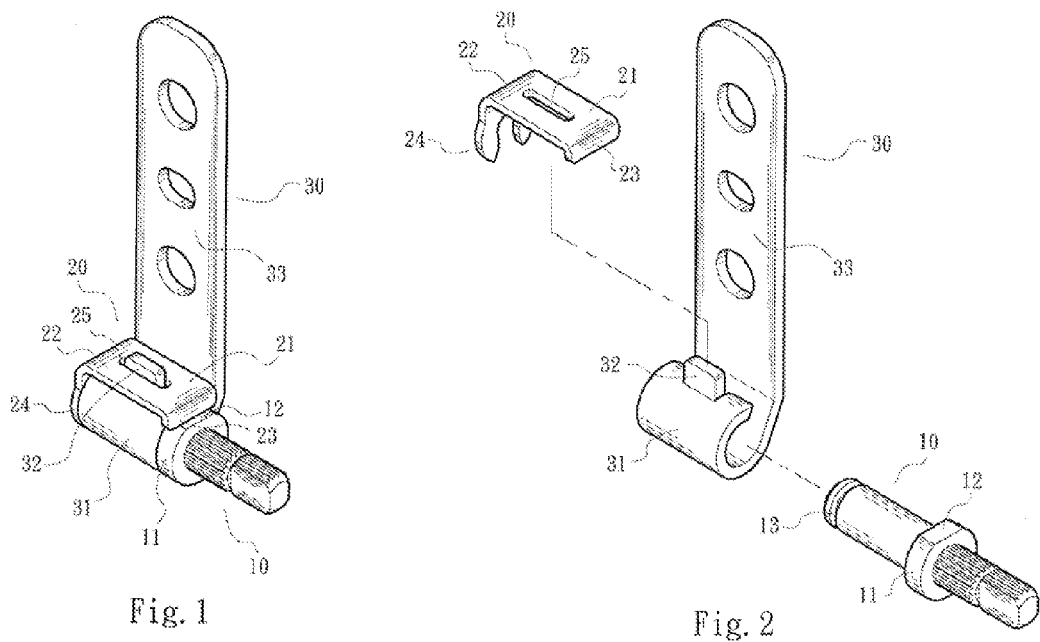
FIG. 1 is a schematic view of an outlook structure of the invention, showing an assembly condition of a shaft body, a carrier and a braking device.
FIG. 2 is an exploded schematic view of the structure of FIG. 1.
Figure 3:
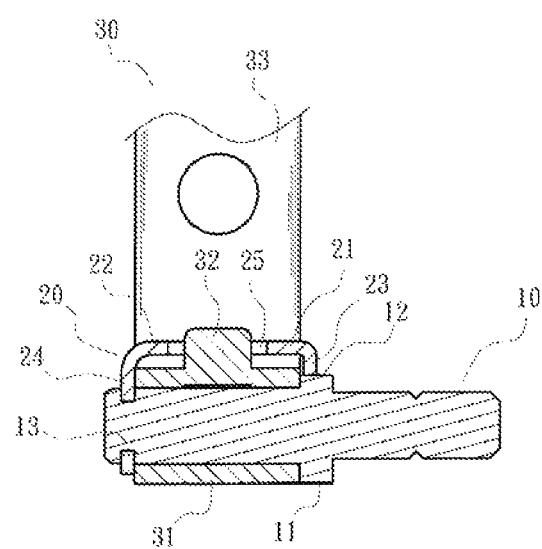
FIG. 3 is a sectional schematic view of the structure of FIG. 1, showing the assembly condition of the shaft body, the carrier and the braking device.

Referring to FIGS. 1, 2 and 3, a rotary shaft structure of the invention comprises a combination of a shaft body and a braking device, in which the shaft body and the braking device are generally denoted by reference numbers 10 and 20, respectively. The shaft body 10 selectively formed by type of a cylindrical body is assembled on an electronic apparatus (not shown in FIGs.). Specifically, the shaft body 10 is assembled with a carrier 30, and the shaft body 10 and the carrier 30 are respectively assembled on a machine body module and a motion module (e.g., a cover or a display screen) of the electronic apparatus. Therefore, with respect to the electronic apparatus, when a user operates the motion module to rotatably open or close the machine body module, the motion module of the electronic apparatus drives the carrier 30 (or the shaft body 10) to form a relative rotation.

In an adopted embodiment, the carrier 30 is provided with a sheathing portion 31 and a convex portion 32 formed on the sheathing portion 31, in which the sheathing portion 31 of the carrier 30 is coveringly assembled with the shaft body 10, and therefore the shaft body 10 is rotated within the sheathing portion 31 of the carrier 30. Besides, the carrier 30 further comprises an extended portion 33 pivoted to the motion module of the electronic apparatus, so that the carrier 30 is motioned to follow the movement of the motion module of the electronic apparatus.

In these figures, the braking device 20 formed by type of a laminate article is also depicted. The braking device 20 is preferably formed by type of an elastic body. The braking device 20 corresponding to the convex portion 32 of the carrier 30 is formed with a hole 25 pivoted to the convex portion 32 of the carrier 30, so that the braking device 20 is motioned to follow or response to the rotation of the carrier 30.

In FIGS. 1, 2 and 3, it is particularly depicted that the braking device 20 comprises a first end 21 provided with a limiting portion 23 and a second end 22 provided with an assembling portion 24 pivoted to the shaft body 10. In the adopted embodiment, the assembling portion 24 and the second end 22 of the braking device 20 are formed by a mutually perpendicular type, and the assembling portion 24 formed by type of a claw-shaped object is fastened on a groove 13 of the shaft body 10, so that the rotary shaft or the carrier 30 does not generate axial displacement or slackness. The groove 13 formed on a tail end of the shaft body 10 is depicted in these figures.

In a preferred embodiment, the shaft body 10, which is corresponding to the first end 21 of the braking device 20 and the limiting portion 23 provided thereon, comprises a base portion 11 and at least one braking portion 12 formed on the base portion 11, and the limiting portion 23 of the first end 21 of the braking device 20 is normally formed in a contact or an interference state with the base portion 11 or the braking portion 12 of the shaft body 10.

In the adopted embodiment, the braking portion 12 of the shaft body 10 is formed by type of a plane, and the base portion 11 of the shaft body 10 is formed by type of an annular body. The limiting portion 23 of the braking device 20, corresponding to the plane-type braking portion 12 of the shaft body 10, is also formed by type of a plane. Therefore, when the limiting portion 23 of the first end 21 of the braking device 20 and the braking portion 12 of the shaft body 10 are generated with an interference state, a stable locating function can be certainly formed accordingly.

Figure 4:
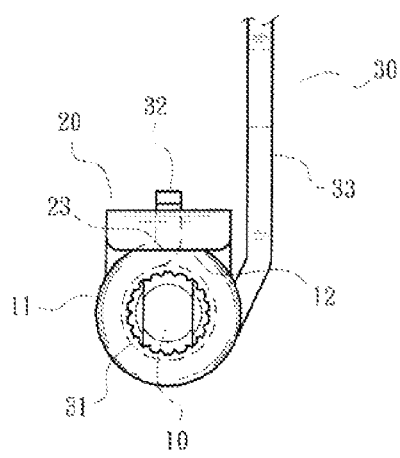
FIG. 4 is a plane schematic view of the invention, showing a fitting condition of an interference state formed by a limiting portion of a braking device and a braking portion of a shaft body.
Figure 5:
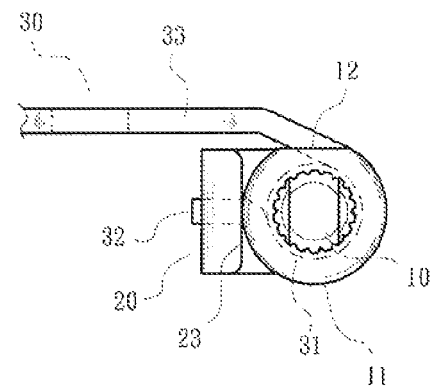
FIG. 5 is a plane schematic view of an operational embodiment of the invention, showing a fitting condition of an interference state formed by a limiting portion of a braking device and a base portion of a shaft body when the braking device driven by a carrier is rotated.

Referring to FIGS. 4 and 5, with convenience of describing the configuration and operation, it is presumed that the motion module (or the carrier 30) depicted in FIG. 4 is situated at an opened position, and the motion module (or the carrier 30) depicted in FIG. 5 is situated at a position that the motion module (or the carrier 30) is closed in the machine body module. FIG. 4 depicts that the limiting portion 23 of the first end 21 of the braking device 20 and the braking portion 12 of the shaft body 10 are formed in an interference state, so that a locating function can be built.

When the user operates the motion module to cause the carrier 30 to rotate from the location of FIG. 4 toward the location of FIG. 5, the carrier 30 drives the limiting portion 23 of the braking device 20 to move toward a position which is depart from the braking portion 12 of the shaft body 10. In view of the base portion 11 of the shaft body 10 having a radius greater than a distance measured from the braking portion 12 of the shaft body 10 to a center position of the shaft body 10, when the limiting portion 23 of the braking device 20 driven by the carrier 30 is formed in a contact or an interference state with the base portion 11 of the shaft body 10, the braking device 20 pushed by the base portion 11 of the shaft body 10 is stored with energy so as to cause the carrier 30 and the motion module to be immediately positioned as being rotated, as the condition depicted in FIG. 5, for example.

Representatively speaking, with the conditions of operative rotational and locating functions of the rotary shaft structure, the invention provides the considerations and advantages as follows, compared with conventional skills.

Firstly, the structure of and components (e.g., the base portion 11 and the braking portion 12 of the shaft body 10 cooperated with the limiting portion 23 of the braking device 20, etc.) connected therewith have been redesigned and reconsidered, providing aspects distinguished from the structural patterns applied with multiple washers and friction plates in conventional skills. Besides, undesirable conditions, such as abrasion and improper locating effects often occurred in the embedded structure of the locating flange, the convex pockets or the concavo-convex locating portions of the related components in conventional skills after an operation period, can be greatly improved accordingly.

Secondly, with the structure design of the limiting portion 23 of the braking device 20 fitted with the braking portion 12 of the shaft body 10 as well as the assembling portion 24 of the braking device 20 fastened on the groove 13 of the shaft body 10, the rotary shaft or the carrier 30 does not generate axial displacement or slackness, apparently different from the structure patterns of the combined rotary shaft applied with washers, friction plates and elastic elements and two ends thereof further respectively fixed with fasteners in conventional skills. Moreover, improper conditions of conventional skills, such as assembly and fitting difficulties, complication and time-consuming process can be improved.

Accordingly, the invention effectively provides a rotary shaft structure featuring of a unique spatial pattern and incomparable advantages and inventiveness, superior to conventional skills.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A rotary shaft structure, comprising:
   a combination of a shaft body, a carrier and a braking device rotational engaged with the shaft body, in which the braking device comprises a first end provided with a limiting portion and a second end, the shaft body comprises a base portion and at least one braking portion formed on the base portion, and the limiting portion of the first end of the braking device is normally formed in a contact state with the base portion of the shaft body and is in rotational engagement with the base portion,
   the carrier having a sheathing portion and a projected portion formed on the sheathing portion, and the sheathing portion of the carrier is coveringly assembled with the shaft body, so that the shaft body is rotatable within the sheathing portion of the carrier;
   wherein the second end of the braking device is provided with an assembling portion pivoted to the shaft body and the assembling portion is claw-shaped and fastened on a groove of the shaft body.

2. The rotary shaft structure as claimed in claim 1, wherein the shaft body is formed of a cylindrical body adapted to be mounted to an electronic apparatus which has a motion module and a machine body module, the shaft body and the carrier are respectively assembled on the machine body module and the motion module of the electronic apparatus, and a rotation of one of the carrier and the shaft body is driven by the electronic apparatus.

3. The rotary shaft structure as claimed in claim 2, wherein the carrier further comprising an extended portion pivoted to the motion module of the electronic apparatus, so that the carrier is motioned to follow the motion module of the electronic apparatus.

4. The rotary shaft structure as claimed in claim 1, wherein the braking device is a laminate article.

5. The rotary shaft structure as claimed in claim 1, wherein the braking device is an elastic body.

6. The rotary shaft structure as claimed in claim 1, wherein the braking device is formed with a hole the projected portion of the carrier is inserted through the hole, so that the braking device is pivoted with the carrier.

7. The rotary shaft structure as claimed in claim 1, wherein the assembling portion is perpendicular to the second end of the braking device.

8. The rotary shaft structure as claimed in claim 1, wherein the groove is formed on a tail end of the shaft body.

9. The rotary shaft structure as claimed in claim 1, wherein the braking portion of the shaft body is formed as a plane, and the limiting portion of the braking device is also formed as a plane.

10. The rotary shaft structure as claimed in claim 1, wherein the base portion of the shaft body is formed as an annular body.

11. The rotary shaft structure as claimed in claim 10, wherein the base portion of the shaft body has a radius greater than a distance measured from the braking portion of the base portion to a center position of the shaft body.

* * * * *